3,758,311
PREPARING OF BAKED GOODS WITH
COATED SALT
Karl L. Fortmann, Towaco, N.J., assignor to Pennwalt
Corporation, Philadelphia, Pa.
No Drawing. Continuation-in-part of application Ser. No.
742,509, July 5, 1968, which is a continuation-in-part
of application Ser. No. 651,714, July 7, 1967, both
now abandoned. This application Nov. 27, 1970, Ser.
No. 93,401
Int. Cl. A21d 8/00
U.S. Cl. 99—90 R          11 Claims

ABSTRACT OF THE DISCLOSURE

A salt-liberating composition for use in a dough preparation, permitting substantial savings in the amount of work required for mixing the dough, wherein a film-forming emulsifier, fat, hydrogenated oil or wax (largely releasable from the salt only late in the mixing cycle and during subsequent dough preparation periods, but prior to baking), is used as a coating upon the salt particles. Where a coarse salt particle is employed any fat, hydrogenated oil or wax must have a dispersing agent distributed throughout it to prevent formation of salt spots in the top crusts of the baked product.

CROSS REFERENCE TO RELATED APPLICATIONS

This application is a continuation-in-part of copending application Ser. No. 742,509, filed July 5, 1968, which in turn is a continuation-in-part of application Ser. No. 651,714, filed July 7, 1967, and both now abandoned.

BACKGROUND OF THE INVENTION

In all of the various methods for making baked goods, the dough ingredients, including those useful in making bread, roll, sweet, doughnut and cracker doughs, are incorporated in one or more steps into a substantially complete blended or premixed dough mixture, which then is worked. Various methods of dough preparation used commercially in bread making, including the "straight," "sponge" and "continuous" processes are described in U.S. 2,953,460, dated Sept. 20, 1960. In every process the working step involves the expenditure of considerable energy, and requires the use of valuable mixing equipment for periods of time generally proportional to the total work needed to be performed per pound of dough. In many dough preparations, the working operation is continued until optimum consistency is obtained, corresponding roughly to a stage of maximum resistance to working, indicated by a peak in the power drawn by the motor driving the mixing equipment. Obvious savings in time and in plant, power, and labor costs can be effected by substantially decreasing the energy required for working the dough. On the other hand, it has been recognized that the presence of dissolved salt in the dough mixture (baked goods usually require common salt in flavoring amount in the dough in the neighborhood of 2%, and may vary from 1% to 3% based on the weight of the flour supplied to the dough) sharply increases the amount of work required to attain optimum consistency.

PRIOR ART

It has been proposed in a theoretical discussion (G. Dalby, The Bakers Digest, August 1960, p. 36) to incorporate in the premixing step a coated salt that would permit its being soluble in the dough only at the end of the mixing or working period, but no edible coated salt has been proposed which would satisfy the delicate balance of adequately avoiding premature solution during the mixing, thus losing the major benefits of coating, while still providing adequately uniform distribution of the salt as an effective flavoring ingredient in the baked product. While a coated salt product for use in meats is disclosed in U.S. Pats. 2,634,212 and 3,261,692 and use of such salt is suggested in the '692 patent in frozen doughs for biscuits, bread, or the like to avoid generation of rancidity during storage, there is no appreciation of the necessity that the coating be "releasable" as defined herein to provide a baked product substantially devoid of salt spots in the top crust nor any teaching or suggestion how the coating can be made "releasable." By "releasable" as used herein is meant a substance which when present as a film-forming coating upon a salt particle, will substantially completely separate from the particle during the period of dough preparation but resist appreciable separation due to abrasion during mixing to optimum consistency.

SUMMARY OF THE INVENTION

In accordance with the present invention a salt-liberating composition for use in a dough preparation is provided comprising particles of common salt bearing a releasable, edible film-forming coating melting between about 100° F. and 200° F. from the class consisting of (a) a film-forming, water-resistant emulsifier and (b) a film-forming material selected from the group consisting of (i) a fat, (ii) a hydrogenated oil of animal or vegetable origin, (iii) a wax of animal or vegetable origin and (iv) a higher alkane wax; provided however, that where said particles are so coarse that at least about 65% by weight of said particles, prior to coating, are retained on a U.S. standard 60 mesh screen (60 openings per linear inch), the said material bears, dispersed substantially uniformly throughout, at least about 0.1% by weight based on the weight of said material of a dispersing agent. The composition of the present invention provides improved efficiency compared to known dough systems in dough mixing operations when used to supply salt to conventional doughs. Conventional dough forming ingredients such as flour, water, yeast, sugar, milk, and shortening may be present, as may components for special doughs such as "no-time" dough, e.g. yeast food, dough oxidants and dough-conditioning enzymes. The manner of combining the various ingredients is not critical and the claimed composition is useful in any commercial dough forming operation. For instance in bread-making, any of the straight, sponge and continuous processes and various modifications of these processes can use the claimed composition to advantage. The invention broadly encompasses an uninterrupted process for making baked goods by mixing otherwise salt-free, dough-forming ingredients with the salt-liberating composition described previously, proofing the dough and baking the shaped forms made from the dough. Use of the composition of the present invention not only dramatically reduces the energy required to combine and knead or mix the dough ingredients (since the coating retards dissolution of the salt in the aqueous dough medium during mixing), but it also inhibits salt-spot formation, in the crusts of the baked product. Salt spots on the crust's surface of baked goods are unsightly and products containing them lack commercial acceptability and have a non-uniform flavor.

The salt

The size of the salt particle used in the present invention is critical in obtaining baked goods lacking a substantial number of salt spots in the top crusts of the baked goods produced. Good results, i.e. normally undetectable, or very few, salt-spots, are obtained using a salt wherein at least 60% passes a 60 mesh screen. A typical "fine" salt for this purpose is "Morton Culinox 999 Fine Salt." When the salt particles are so coarse that 65% by weight or more are retained on a 60 mesh screen, it becomes necessary, to avoid objectionable salt-spot formations in the crusts of baked goods, to use a dispersing agent in the coating material. A typical "coarse" salt is "Morton bakers' 'A' salt" which requires the use of a dispersing agent in the coating to provide a commercially acceptable product. Particularly large particles, e.g. those retained on a U.S. 30 mesh sieve are undesirable. A typical sieve analysis of regular baker's salt and the preferred "fine" salt of the present invention is presented in Table I which reports the percent by weight of each of the "regular" and "preferred" salts retained by screens of the indicated mesh sizes.

TABLE I

| Mesh size | Regular | Preferred |
|---|---|---|
| 30 | 5.31 | 0.03 |
| 60 | 87.00 | 39.90 |
| 100 | 6.89 | 53.60 |
| 200 | 0.63 | 5.95 |
| Fines | 0.09 | 0.54 |

Film-forming coating

The edible film-forming coating used in conjunction with the salt particles to produce the composition of the present invention must be one which resists abrasion, so that little is removed during early mixing operations when the mixture is highly fluid in character but will part from the salt during subsequent processing prior to baking, i.e. in the "developed" dough. In other words the coating should remain substantially intact in a dynamic system such as is encountered in moist mixing and kneading operations but should part from the salt during late stages of the mixing and during floor time, dividing, rounding, overhead proofing and final proofing, to promote diffusion of the salt throughout the dough constituents.

The "releasability" of the coating in a developed dough system has been observed to be a function of the nature of the film-forming coating and the size of the salt particle. When a film-forming emulsifier, such as a higher fatty acid (i.e. containing at least 9 carbon atoms) mono- or di-glyceride or alkoxy derivative is used as a coating, particle size of the salt does not appear to be a factor when using normal, baker's salt. On the other hand when a fat, an animal or vegetable hydrogenated oil or wax or a higher alkane wax is employed for coating purposes, a dispersing agent, in minor amounts, must be distributed throughout the coating to facilitate salt liberation in dormant dough systems whenever the salt has a particle size so coarse that 75% or more is retained on a 60 mesh U.S. standard screen. While applicant does not wish to be bound by any theory of operation, it is believed that the propensity for smaller particles to shed certain coatings more readily than larger particles is due to the presence of thinner and perhaps less complete coatings upon the finer particles due to the increased surface area present in the same weight of fine versus coarse particles.

Melting point is also important in the choice of a film-forming coating to form the salt-liberating composition of the present invention. A practical minimum for the softening temperature or melting point of the coating material is 100° F., and the material should have a melting point lower than baking temperature. Taking into account the usual baking temperatures for ordinary bread, which are somewhat lower at the center of a loaf having a conventional size and shape than in the regions adjacent to the crust, the coating material should melt at a temperature near, or lower than 200° F. Accordingly, the coating materials ordinarily should be non-tacky at room storage temperatures and have a melting point within the range of from about 100° to about 200° F. For most fatty coating materials a melting point within the range of from about 130° to about 160° is recommended and about 140° F. is preferred. When predominantly waxy materials are used for the coating, it is recommended that they have a melting point within the range of 140° to 200° F., preferably with substantial softening at 145° to 165° F. Most hard fats having a titer of 60° C. (140° F.) form a good coating and provide a free-flowing coated salt without sticky or waxy surfaces. The substantially lipophilic and hydrophobic nature of the edible fats and hydrogenated oils of animal and vegetable origin, having the desired melting point, has recommended these generally fatty materials for use as the coating material. Thus hydrogenated cottonseed oil and other hydrogenated vegetable oils of suitable titer, can provide the required physical properties including hydrogenated forms of soybean oil, coconut oil, safflower oil, peanut oil, palm kernel oil, and corn oil. The fatty triglycerides, and the common fats and fatty oils of commerce occurring as mixtures thereof, such as the oils already mentioned, are examples of suitable edible materials, some of the fats also being improved for this purpose by hydrogenation, e.g. hydrogenated tallow, hydrogenated lard, and interesterified lard. Monoglycerides and diglyceries, although tending to be more hydrophilic, still may be quite effective, alone or in admixture with a fatty material such as hydrogenated cottonseed oil, and some natural fats include minor proportions of monoglycerides and diglycerides.

Edible waxy materials, preferably softening in the region of about 155° F., exhibit equivalent lipophilic and hydrophobic properties and may be used similarly. For this purpose animal and vegetable waxes and also higher alkane waxes are available. The animal and vegetable waxes are esters of higher fatty acids and higher monohydric alcohols, and frequently include also some free higher acids, free higher alcohols, and hydrocarbons. High-melting waxes chemically related to the animal and vegetable waxes may be derived from certain lignites. The higher alkane waxes are exemplified by certain mineral waxes, notably paraffin wax, and by synthetic waxes, obtainable in a variety of desired melting point ranges, which usually contain also some unsaturated aliphatic hydrocarbons and oxygenated compounds.

Dispersing agent

As pointed out previously to minimize salt spots in the baked products, arising from incomplete or too slow elimination of certain coating on coarse salt particles, it is necessary to distribute in such coatings a small proportion of a dispersing agent. Such an agent permits incipient dissolution or emulsification of the coating during the terminal portion of the mixing cycle, and hastens elimination of the coating and diffusion of the salt during proofing. Lecithin and lecithin derivatives are preferred as a dispersing agent. The term "lecithin" in commercial usage has been described by a major supplier (Central Soya Company, Inc.) as a naturally occurring mixture of similar compounds more accurately identified as phosphatides or phospholipides. The principle components of the natural mixture are chemical lecithin (phosphatidyl choline), cephalin (phosphatidyl ethanolamine), lipositol or inositol phosphatides (phosphoinositides), and related phosphorus-containing lipides. Lecithins are commercially available with or without various carriers such as the soybean oil or corn oil in which the natural or commercial lecithin is dissolved. The term "lecithin" is used herein to include the commercially available modified lecithin releasing agents, notably hydroxylated lecithin (hydroxylecithin) which has increased hydrophilic properties. The various components of these lecithin and modified lecithin materials, herein generically designated "lecithin," have related properties and are useful, separately or in combinations, for inclusion in minor proportions in the coating materials employed in accordance with the present invention. Other suitable dispersing agents include sodium lauryl sulfate and the ethoxylated derivatives of the partial esters of sorbitan and highly fatty acids.

Coating methods

The method of coating the salt is not critical. In any method of coating the weights of materials are calculated to provide a coating constituting from about 8% to about 30% by weight of the salt-liberating composition. For ordinary baker's salt and other coarse salts, a product wherein the coating constitutes from about 10% to about 12% is preferred, when using a fine particle salt, a somewhat higher weight percentage of coating, i.e. from about 10% to 30%, is preferred in view of the higher surface area of the smaller particles. Melt-coating, solvent coating and spray-coating are all suitable techniques for application of the film-forming salt-releasable coating as illustrated below.

Melt coating

A measured amount of the coating material (containing when necessary, a dispersing agent) is melted in a suitable vessel over a hot water bath, the melt ordinarily reaching a temperature of approximately 180° F., and the calculated weight of salt is added. The mixture is stirred and warmed until all of the salt granules have had an opportunity to be covered by the melt. The mixture then is permitted to cool until the coating is solidified, agitation by stirring being continued to avoid lumping.

Solvent coating

Solvent coating and spray coating techniques are also suitable. Thus in a typical solvent-coating procedure 19.7 grams of hydrogenated cottonseed oil flakes and 0.3 gram of hydroxylated lecithin are dissolved in 100 ml. of chloroform, and 180 g. of baker's salt are added to the solution. The solvent is removed by vacuum and heat in a laboratory rotating flask evaporator, the solid coating material building up on the salt particles as the evaporation proceeds.

Spray coating

To illustrate spray-coating, 16.2 pounds of cold baker's "A" salt is placed in a Patterson-Kelley "Liquid-Solids" twin shell rotating blender of a type widely used in laboratories. A molten spray formed from the melt of 1.78 pounds of hydrogenated lard flakes and 0.02 pound of hydroxylated lecithin is introduced into the blender and spray-coating of the salt particles is accomplished readily. The resulting cooled coated salt product is handled without any substantial difficulties caused by agglomeration.

EXAMPLES

The following examples are coated to illustrate the invention. They are not intended to limit it in any manner. Values reported in the various examples illustrating comparative results have absolute validity only for the systems in which they are obtained because of variations attributable to differences among batches of the various dough forming components particularly flour and yeast and variations caused by different conditions under which runs of the various examples are made, particularly temperature.

Example 1

This example illustrates the effect of coated salt in reducing the energy required to prepare dough mixtures.

(A) A coated salt is prepared using as the coating material hydrogenated cottonseed oil flakes having a melting point of 140° F. Granulated baker's salt is coated by the melt technique with sufficient amounts of this hydrogenated cottonseed oil to obtain a coating comprising in the aggregate 16% of the weight of the coated salt. The coated salt is added to a bread dough mixture prior to the kneading operation in which development occurs, in the proportion of two pounds of the salt itself per 100 pounds of flour, the dough being mixed and worked in 5-pound batches in a closed mixer under pressure. The mixing power requirements are compared with those for a similar dough mixture without added salt and for another with the same proportion of uncoated salt and the results are shown in Table II.

TABLE II

| Run No. | Salt used | Watt-hours per lb. of dough | Mixing time, sec. |
|---|---|---|---|
| 1 | No salt | 2.76 | 59 |
| 2 | Uncoated salt | 6.04 | 177 |
| 3 | Coated salt | 2.71 | 54 |

To determine the mixing power in terms of watt-hours, the areas under the curves from the recording wattmeter are integrated graphically over the mixing times, giving values proportional to the net work done on the dough.

(B) Analogous tests are carried out using a standard Hobart, laboratory type, open batch mixer, having the customary fork-shaped mixing element rotating with planetary action on a vertical axis in cooperation with a centrally oriented rod in the vertically disposed mixing bowl. This mixer is used in many bread laboratories, and is considered to operate in a manner comparable to the operation of the larger, horizontally arranged batch mixers widely used in bakeries. A sponge is prepared and fermented following conventional sponge dough techniques, and the sponge is returned to the mixer. Thereafter an amount of baker's salt equal to 2% of the weight of the flour is added and blended in before the effective working or kneading of the final dough mixture commences. When uncoated salt is used, a total mixing time of five minutes is required. When the test is repeated using the same weight of baker's salt, but with the particles coated as above using 100 lbs. of coating material per 500 lbs. of salt (16.7% coating), the mixing time is decreased to three minutes. Of the total mixing times given, the first minute of operation of the mixer is at relatively slow speed, as is conventional to effect adequate blending of the dough mixture.

(C) Another series of tests is carried out in a closed batch mixer to determine the effect of variations in the proportions of coating material used in preparing the coated salt. Granulated baker's salt again is coated with sufficient amounts of the hydrogenated cottonseed oil to obtain a coating comprising in the aggregate the specified proportion of the coated salt. In all cases the amount of salt again is added in the proportion of 2 pounds of the salt itself to 100 pounds of flour. The results are shown in Table III.

TABLE III

| Run No. | Salt used | Watt-hours per lb. of dough | Mixing time, sec. |
|---|---|---|---|
| 1 | Uncoated | 6.39 | 190 |
| 2 | 10% coating | 3.27 | 66 |
| 3 | 12% coating | 2.66 | 61 |
| 4 | 16% coating | 2.64 | 60 |
| 5 | 20% coating | 2.60 | 62 |

(D) The coated salt resulting from the solvent-coating technique described previously is substituted for ordinary uncoated salt in a conventional white bread dough with the usual 2% of salt, whereupon the mixing time is decreased from 120 to 70 seconds (i.e. 42% reduction).

(E) The coated salt resulting from the spray-coating technique described previously is substituted for the same amount of ordinary uncoated salt in conventional white bread dough, reducing the required mixing time from 120 seconds to 60 seconds (a 50% reduction). The baked bread has some barely discernible salt spots but is considered to be an entirely satisfactory product. In this embodiment the salt bears 10% by weight of fatty coating material containing slightly more than 1% lecithin (based on coating material).

Although each of runs (A), (B) and (C) of this example (using baker's salt and no dispersing agent in the coating) illustrate the energy-saving advantage of using a coated salt in dough forming operations, the baked products made from these doughs were observed to have visible salt spots in the crust causing the products to have only border-line commercial acceptability. On the other hand the baked goods from the doughs of runs (D) and (E) (wherein a dispersing agent is present in the coating of the baker's salt) have a top crust commercially acceptable although faint salt spots are visible to the practiced eye.

Example 2

This example illustrates the effect of the lecithin derivative in inhibiting the formation of salt spots in the crust of the baked goods as well as the decreased mixing time to reach optimum consistency when using the salt-liberating composition of the present invention.

In preparing the coated salt, hydrogenated cottonseed oil is melted and hyroxylated lecithin is added to the melt, after which baker's salt is stirred in and the mixture is allowed to cool while stirring. Bread dough is prepared using 2.25 pounds of coated baker's salt per 100 pounds of flour. The effect on mixing time to prepare bread dough in 5-pound batches in a closed mixer, when using coated salt with indicated coatings by weight (based on weight of total salt) and varying proportions of hydroxylated lecithin in the coatings (based on weight of the coatings) is reported in Table IV.

TABLE IV

| Run No. | Coating (wt. percent) | Hydroxylated lecithin (wt. percent) | Mixing time (sec.) | Spots in top crust |
|---|---|---|---|---|
| 1 | 0 | (1) | 180 | None. |
| 2 | 20 | 0 | 60 | Many. |
| 3 | 20 | 1 | 80 | Considerable. |
| 4 | 20 | 2.5 | 120 | Few. |
| 5 | 20 | 5 | 123 | None. |
| 6 | 20 | 10 | 145 | Do. |
| 7 | 15 | 1.33 | 77 | Few. |
| 8 | 10 | 2 | 90 | Very few. |

1 Uncoated.

Run 2 in Table IV shows the maximum benefit in decreased mixing time, equivalent to the mixing time encountered with salt-free doughs, but numerous salt spots remain in the top crust of the baked loaves. Run 3 indicates, however, that the inclusion of only 1% hydroxylated lecithin in the coating results in a noticeable decrease in the salt spots appearing in the crust, while the mixing time remains almost as short as in run 2. When the hydroxylated lecithin is increased to 2.5% of the coating the mixing time still is only two thirds of the time required with uncoated salt, while only a few salt spots remain. Increasing the hydroxylated lecithin to 5% of the coating achieves virtual elimination of salt spots without a substantial additional further increase in the mixing time. The hydroxylated lecithin preferably comprises from about 1% to 5% of the coating. When the hydroxylated lecithin is raised to 10% of the coating, however, the increase in the mixing time tends to become unnecessarily large so that use of still higher proportions of hydroxylated lecithin are not indicated. Runs 7 and 8 show that excellent results can be obtained when the proportion of the coating containing the hydroxylated lecithin is decreased to 15% and even to 10% of the coated salt, although it will be appreciated that greater care must be taken in the coating operation to insure that the thinner coated films provide a uniform, continuous covering on each salt particle. The hydroxylated lecithin acts as a spreading and dispersing agent, and so tends to facilitate the formation of thin but sound coating films. Runs 7 and 8 show that it is possible to achieve a great decrease in mixing time with the smaller proportions of coating material when the coating operation is carried out carefully, and further that salt spots can be eliminated quite effectively from the crust even when the hydroxylated lecithin constitutes 2% or less of the coating on the salt particles. In fact, hydroxylated lecithin additions of as little as 0.1% have been found useful in the coating material used with salt of certain particle sizes and shapes.

Example 3

This example illustrates use of doughs of the present invention in continuous dough-making methods. For this example apparatus used is essentially a scaled down variation of apparatus used commercially in the continuous mixing process (cf. U.S. Pat. 2,953,460). Extensive experience with this laboratory continuous mixer has demonstrated that its operation is quite analogous to that of commercial continuous dough-mixing apparatus.

(A) A commercial bread dough formula is used in which the salt included, whether coated or uncoated, is present in the proportion of 2 pounds per 100 pounds of flour. Hydrogenated cottonseed oil having a melting point of 140° F. is used as a coating material and the coating constitutes, in the aggregate, 20% of the weight of the coated salt. In some of the runs various amounts (expressed in weight percent based on weight of the coating) of hydroxylated lecithin is included in the coating. The mixer speed, a measure of the power consumed during the passage of the premixed dough through the confined chamber, where it is worked until optimum consistency and effective development are achieved, is observed. The power input, and hence mixer speed, are adjusted during the initial operation with each dough mix so that the discharged dough is found to have the qualities associated with effective development. The results are reported in Table V.

TABLE V

| Run No. | Hydroxylated lecithin in salt coating, percent | Mixer speed, r.p.m. | Spots in top crust |
|---|---|---|---|
| 1 | (1) | 145 | None. |
| 2 | 0 | 90 | Many. |
| 3 | 1 | 100 | Do. |
| 4 | 2.5 | 105 | Considerable. |
| 5 | 5 | 110 | Very few. |
| 6 | 10 | 115 | None. |

1 No waiting

From the above it will be apparent to those skilled in the art that not only is a saving in power costs realized with decrease in mixer speed, but when the maximum mixer power requirement per pound of dough is decreased the same continuous mix installation can be arranged and operated at a higher throughput, thus directly increasing bakery production. This increased continuous production capacity when using the coated salt of the present invention may be obtained simply by increasing the speed of the metering pump feeding the mixer-development chamber, with a similar speeding up of the operation of the divider knife at the output end of the chamber. The mixer speed then is increased proportionately, thus using about the same mixer power per pound of dough as with uncoated salt, while still obtaining effective development of the dough and achieving markedly higher throughput.

Another advantage of the decrease in the mixing power required per pound of dough is that a lower temperature is reached in the dough. Thus in the runs of Table V dough temperature increases regularly with increase in mixer power from 95° F. in run 2 to 98° F. in run 6 and reaches 101° F. in the control test of run 1.

(B) In another series of tests a conventional roll dough is employed to compare the use of uncoated baker's salt, and the coated salt of (A) above, both without and with 1% hydroxylated lecithin in the coating, the coating being about 16% of the weight of the coated salt. The dough is formed using a liquid sponge technique with 50% flour in the ferment. After blending of the fermented sponge with the remaining flour and other ingredients, the dough is developed in a closed batch mixer filled with dough under a pressure of 20 p.s.i., simulating the working and development action obtained with continuous dough-making apparatus. Each dough sample is worked just past the peak in the power required for mixing. Instead of baking in roll form, it is convenient to scale the developed dough to loaf size pieces, whereupon the loaves are panned, proofed, and baked to evaluate the quality of the baked goods and to confirm the stability and suitability of the developed dough for conventional roll dough processing. The test results are summarized in Table VI.

TABLE VI

| Run No. | Salt used | Watt-hours per lb. of dough | Mixing time, sec. | Spots in top crust |
|---|---|---|---|---|
| 1 | None | 2.4 | 45 | None. |
| 2 | Uncoated salt | 4.7 | 120 | None. |
| 3 | Cottonseed oil flake coating | 2.5 | 47 | Many. |
| 4 | Lecithin in coating | 2.5 | 51 | Fewer. |

Example 4

This example illustrates the reduction of proofing periods possible when preparing doughs using the composition of the present invention.

The presence of dissolved salt in doughs or dough ingredients tends to inhibit yeast action. This in turn necessitates longer proofing periods following the original mixing, working, and dividing operation, in order to maintain and restore the dough to optimum consistency for baking. Maintenance of an adequate water-insoluble coating on the salt prior to baking accordingly provides an added benefit in the savings attributable to decreased proofing time. This benefit is realized, for example, in both batch and continuous bread-making methods.

To illustrate the effect of the coated salt upon proofing time, this variable was observed for preparations described in Examples 3(A) and (B) and are reported below in Tables VII(A) and VII(B) respectively.

TABLE VII(A)

| Run No. | Hydroxylated lecithin in salt coating, percent | Proofing time, min. |
|---|---|---|
| 1 | (¹) | 61 |
| 2 | 0 | 53 |
| 3 | 1 | 54 |
| 4 | 2.5 | 54 |
| 5 | 5 | 55 |
| 6 | 10 | 58 |

¹ No coating.

TABLE VII(B)

| Run No. | Salt used | Proofing time, min. |
|---|---|---|
| 1 | None | 47 |
| 2 | Uncoated salt | 67 |
| 3 | Coated salt (cottonseed oil) | 48 |
| 4 | Coated salt (cottonseed oil) plus lecithin | 54 |

Example 5

This example illustrates the highly beneficial results obtained upon use of the composition of the present invention in combination with L-cysteine to reduce the mixing time of a dough.

L-cysteine ordinarily is added to bread dough in the form of the hydrochloride salt, conveniently the monohydrate or other hydrate thereof. Apparently it acts by a chemical reducing action to decrease the mixing energy required for the dough. The simultaneous use of coated salt and cysteine results in a remarkable decrease in mixing time. To demonstrate this effect, both the coated salt and L-cysteine hydrochloride monohydrate powder are added to a bread dough, with results shown in Table VIII. The coated salt particles carry a hydrogenated cottonseed oil coating making up 10% of their weight as coated, and the coating in turn includes 2% hydroxylated lecithin by weight based on the weight of the coating. An amount of salt is provided to give 2.25 pounds of sodium chloride per 100 pounds of the flour present. The amount of the cysteine provided is expressed in Table VIII as a percentage of the combined weight of the salt, coating, and cysteine hydrochloride monohydrate, and also as a fraction (parts per million) of the weight of the flour.

TABLE VIII

| Run No. | Salt used | Cysteine as percent of coated salt | Cysteine as p.p.m. of flour | Mixing time (sec.) |
|---|---|---|---|---|
| 1 | Uncoated | 0 | 0 | 180 |
| 2 | Coated | 0 | 0 | 83 |
| 3 | do | 0.10 | 25 | 65 |
| 4 | do | 0.20 | 50 | 50 |

No salt spots are observed in the top crusts of any of the above preparations. The L-cysteine advantageously is admixed with the particles of coated salt supplied to the blending operation in an amount providing from about 10 to 90 parts, preferably about 20 to 60 parts, of L-cysteine per million parts by weight of the flour included in the dough. When expressed relative to the sodium chloride itself, a coated salt-cysteine mixture preferably comprises, admixed with the coated particles, L-cysteine in powdered particulate form and in an amount between 0.05% and 0.5% of the weight of the sodium chloride. It is noted that the use of ascorbic acid, which also has a reducing action, instead of cysteine, produces similar, though less dramatic results.

Example 6

This example illustrates the highly beneficial results obtained using the composition of the present invention as a component of a "no-time dough," i.e. a dough in which the ingredients are blended and worked to effect development without previous fermentation. In mixing these doughs to obtain full development a greater amount of work is required, compared with the usual fermented doughs, so that the inclusion of ingredients which minimize the energy required for the kneading operation is especially helpful. Once mixed to the state of optimum consistency, such doughs may be supplied directly to the divider, or permitted only a short resting period before dividing, followed by the usual proofing and making procedures. One reason for the necessity of additional mixing energy is the absence of fermentation end products from the no-time dough mixes. Since there has been no opportunity for enzyme action to condition the dough, such mixes should include dough-conditioning enzyme material which can act on the flour during the mixing and subsequent processing. Some of the problems in obtaining good results with no-time dough mixes result from inhibition of enzyme activity caused by the presence of dissolved salt in the mix, so that use of coated salt also is most advantageous.

In no-time dough mixes, it is also convenient to include dough oxidants in greater amounts than are usually supplied for conventional dough formulations. Failure to provide sufficient additional dough oxidant results in unsatisfactory gas retention by the dough and poor quality in the baked product. Since there has been no opportunity with no-time doughs for the yeast to become activated prior to mixing, the addition of supplementary yeast food to a no-time mix is very advantageous.

A no-time dough mix providing the enzyme material in association with yeast food and oxidant ingredients, and containing the coated salt particles required for flavoring without permitting the deleterious action of dissolved salt, is supplied by the edible composition illustrated in the following table giving the ingredients in parts by weight:

TABLE IX

| | |
|---|---|
| Coated salt | 2.00 |
| Ammonium sulfate yeast food | 0.05 |
| Potassium bromate oxidant | 0.0025 |
| Azodicarbonamide oxidant | 0.0013 |
| Fungal dough-conditioning enzyme (Rhozyme A–4*) | 0.0032 |
| Solid emulsifier (mono- and di-glyceride) | 0.25 |
| Calcium acid phosphate | 0.20 |

*Made by Rohm & Haas Co., Philadelphia, Pa.

The coated salt in such a no-time dough mix advantageously may use as the coating material the hydrogenated lard mentioned hereinabove which contains 1% of lecithin and is used in an amount making up 10% of the weight of the coated salt itself. It is convenient to include in such a mix an emulsifier material, which advantageously may be a solid softener in the form of a commercially available emulsifier containing monoglycerides and digylcerides. The calcium acid phosphate is conveniently included as a supplementary yeast food, dough conditioner, and acidifier. The materials listed in Table IX are blended dry to a uniform mixture.

This mix may be added to the dough in sufficient amount to provide 2 parts by weight of salt (not including the weight of the coating material present) per 100 parts of flour in the dough. When so used in no-time doughs, notable decreases in mixing time have been observed, providing mixing times as short as 55 seconds, compared with a mixing time of 150 seconds for a similar mix in which the salt was not coated to inhibit dissolution.

In general, an edible composition in solid particulate form for use in dough mixtures of the no-time dough type advantageously comprises a major portion by weight of sodium chloride particles individually coated with an edible coating material, as described hereinabove, in association with a suitable amount of dough-conditioning enzyme material whose activity is enhanced by preventing the salt from dissolving while the dough is being mixed and prepared for making; the composition also should contain the yeast food and supplementary dough oxidant required for no-time doughs as discussed above. Relative to the weight of the two parts of the coated salt particles in this composition, there should be present about 0.005–0.1 part by weight of ammonium salt yeast food, about 0.0006 part dough oxidant, and about 0.0005–0.006 part dough oxidant, and about 0.0005–0.005 part of the dough conditioning enzyme material.

The yeast food present as an ammonium salt advantageously may be ammonium chloride, ammonium sulfate, or ammonium phosphate. The dough oxidant may be of the slow-acting type, such as potassium bromate or calcium bromate, or the oxidant may be of the fast-acting type, such as potassium or calcium iodate, or preferably azodicarbonamide. In preferred formulations both types of dough oxidants may be included.

The dough conditioning enzyme materials may be proteolytic or amylolytic in nature, and both preferably are provided. The proteases may be papaya, cereal, fungal, and bacterial sources. In addition to malt, which is a conventional source of amylases as well as proteases, fungal and bacterial amylolytic enzymes are available. A suitable fungal enzyme material providing both proteolytic and amylolytic action is available under the trade designation "Rhozyme A–4" manufactured by Rohm & Haas Company.

The no-time dough mix described above in solid particulate form, utilizing the aforementioned coated salt particles and also comprising ammonium salt yeast food, dough oxidant, and dough-conditioning enzyme material in the proportions specified, is used in preparing a dough mixture by blending dough ingredients including flour, water, yeast, and an amount of the dough additive mix sufficient to provide sodium chloride in predetermined proportion for flavoring. The substantially complete dough mixture then is worked in a kneading operation until the dough achieves optimum consistency whereupon the dough is formed into shapes suitable for baking and baked.

Example 7

This example illustrates the effectiveness of the coated salt formulations of this invention on full scale production equipment in regular operation at a large bakery installation. For these tests the sponge method of breadmaking is in use with commercial sponge and dough batches, based on 900 pounds of flour per batch. After blending and working to achieve full development in the mixer, the dough is permitted a resting period before passing through the divider, the rounder, overhead proofer, molder, panner, and final proofer. Floor time for the resting period as ordinarily practiced is 30 minutes, and pan proofing time is 60 minutes.

(A) In the normal operations of this bakery, the blending and working time in the mixer is one minute of slow mixer operation plus 10 minutes of fast working for a total of 11 minutes of mixing. To speed production, the addition of 20.25 pounds of conventional bakers' salt to each batch (2.25% based on the flour) is delayed until the middle of the blending and working operation in the mixer for a saving of two minutes total mixing time per batch, according to the following schedule: 0.5 minute slow mixing plus four minutes fast mixing without the salt, stop the mixer and add the salt, then a further 0.5 minute slow mixing plus four minutes fast mixing, requiring nine minutes total time of the mixing.

To carry out a similar operation with the use of coated salt, a salt having a special fine granulation is substituted for the salt added to the dough. The sieve analysis of this fine salt is given in Table X.

TABLE X

| Mesh No.: | Proportion retained on screen, percent |
|---|---|
| 30 | 0.0 |
| 40 | 0.0 |
| 50 | 0.5 |
| 60 | 1.0 |
| 80 | 38.0 |
| 100 | 38.0 |
| Through 100 | 22.5 |

This fine salt is coated with hydrogenated cottonseed oil flakes constituting 10% of the weight of the salt so coated. The coated salt before use is passed through a 40 mesh sieve to remove any lumps and coarse agglomerates resulting from the coating procedure. Then the dough formulation containing 900 pounds of flour is provided with 22 pounds of the resulting coated salt before being fed to the mixer, giving about 2.2% salt by weight based on the flour. The same 60 titer hard cottonseed oil coating is used.

Operation with the last mentioned dough in two separate batches indicates that full working and development in the mixer is obtained with a further saving of about two minutes in total mixing time, as compared with the operation using delayed addition of salt. Thus, in one run slow mixing for one minute followed by fast mixing for only six minutes provides a slightly overmixed dough. In another run, which may be considered typical for the flour used and conditions encountered, complete mixing is obtained with 7.25 minutes of total mixer operation compared with a total mixing time of 11 minutes when the same procedure is followed, but with uncoated salt provided in the original dough formulation.

With the above described production runs it is observed that the normal floor time or resting time of 30 minutes for the mixed dough is too long, resulting in buckier dough pieces, a tendency toward tearing of the dough and a somewhat more open grain in the crumb of the baked bread. Excellent results are obtained, however, with a floor time of as little as 15 minutes; thus a floor time of some 15 to 20 minutes instead of the usual 30 minutes is indicated for good results. Moreover, the pan proofing time of doughs made with the coated salt is 5 to 7 minutes less than the 60 minute period required with the control dough. The substantially shorter floor time and proofing time are accounted for by the absence of available salt, which ordinarily inhibits fermentation. Alternatively, somewhat less yeast can be included in the dough formulations with resulting savings in formulation costs when using the normal floor time and proofing time, since, in the absence of available salt, the same fermentation activity can be obtained with a smaller proportion of yeast in the dough.

(B) In a different run using the same bakery equipment, the usual, coarser baker's salt is used instead of the finely granulated salt. However, the coating, again 10% by weight, consists of 98.25% hydrogenated cottonseed oil having a melting point of approximately 140° F. and containing hydroxylated lecithin in an amount of 1.75% based on the weight of the coating. Other conditions of this run are substantially identical with (A) above and again full development is obtained with only 1 minute of slow mixing and 6.25 minutes of fast mixing. Quite similar savings in resting time and pan proof time again are realized.

(C) Still another run is made under the same bakery conditions, combining the advantages of coated fine salt particles described in (A) with the addition of cysteine. Cysteine in particulate form is obtained by grinding flakes of L-cysteine hydrochloride monohydrate to a fine powder. Cysteine powder is added to the coated salt by tumbling into it an amount of cysteine to provide, with the specified amount of salt, 20 parts of the monohydrate per million parts by weight of the flour included in the dough. After 1 minute of slow blending and 5.75 minutes of fast working in the mixer, it is found that this total of only 6.75 minutes of mixing time already provides an overmixed dough. (On the basis of this run it is estimated that inclusion in the coated salt-cysteine composition of sufficient cysteine to provide 50 p.p.m. cysteine permits full development of the dough after 1 minute of slow mixing and only 4 minutes or less of fast mixing, or approximately half of the total mixing time of 11 minutes required when only ordinary salt is used. The dough product appears smoother and more pliable than the usual commercially prepared dough. Floor resting time is only 15 minutes and proof time only 55 minutes.

Bread quality in all of the above-described commercial bakery runs usuing the coated salt composition of the present invention is at least equal to the usual commercial product, and in blind tests a laboratory panel can not distinguish between control and test baked samples. No salt spots are evident in the top crust of the test samples, and the panel can not distinguish relialby between the samples by flavor testing, although some panel members feel that the bread with coated salt has a more lingering salty flavor. The step of delayed salt addition is eliminated, and the decreases in mixing, resting, and proofing times provide important savings, which can be used to realize substantial increases in the production capability of a given bakery plant at only slight increase in materials costs.

In each of the embodiments described above, and whether using so-called continuous or batch operations of the types conventionally used in modern bakery practice, it will be observed that baked goods are made from dough prepared by blending dough ingredients including flour, water, and yeast, salt being supplied to the blending operation in the usual flavoring amount, but in the form of salt particles coated to provide continuous coatings of a type described herein. The substantially complete dough mixture is worked in a kneading operation until the dough achieves the optimum consistency, whereupon the dough from the kneading operation is divided into a continuous series of successive shapes. Those familiar with bakery practice will appreciate that the handling of the dough after the dividing operation is carried out so as to avoid unnecessary delays, thus requiring a minimum of plant space and equipment in the production of the finished goods. Thus, as the successive divided shapes are formed, they are subjected continuously in a well known manner to proofing operations for conditioning the dough into a form suitable for baking while retaining or recovering the desirable consistency and development; thereafter the shapes are supplied promptly and continuously to the oven for baking, thus producing the finished baked goods.

Example 8

This example illustrates the use of a wax in producing the composition of the present invention.

Baker's salt is coated with blends softening between about 150° and 160° F. of 50% refined paraffin wax, minor amounts of hydroxylated lecithin, and the balance carnauba wax. The coating material is applied in an amount equal to 10% of the weight of the coated salt. In each instance the coated salt (allowing for the weight of the coating material) is substituted for an equal weight of uncoated salt in a conventional white bread dough formulation, the mixing time is determined, and the resulting dough baked into standard loaves. As the control, the same dough using the ordinary uncoated baker's salt in the amount of 2% of the weight of the flour is prepared by the usual mixing procedures. The results are tabulated in Table XI.

TABLE XI

| Salt coating | Mixing time, sec. | Decrease in mixing time, percent | Spots in top crust |
| --- | --- | --- | --- |
| None (control) | 120 | | No salt spots. |
| 50% refined paraffin, 47.5% carnauba wax, 2.5% hydroxylecithin. | 53 | 56 | Pronounced spots. |
| 50% refined paraffin, 45% carnauba wax, 5% hydroxylecithin. | 67 | 44 | Fewer spots than 2.5% lecithin. |
| 50% refined paraffin, 40% carnauba wax, 10% hydroxylecithin. | 85 | 29 | A few faint spots. |

Other waxes and wax blends can be used in place of the paraffin-carnauba wax combination described above. Thus instead of carnauba wax, suitable waxy blends can be made using a synthetic higher alkane wax. Such a wax, identified as a hard mineral wax made by the Fischer-Tropsch process, is sold under the trade designation "F–T 300" by Dura Commodities Corporation, New York. This is a hard synthetic wax having a melting point range of 210° to 214° F. By adding 10% by weight of this high alkane wax to 90% by weight of refined paraffin wax, a blend is obtained with which baker's salt can be coated without difficulty using the technique of melting, adding the salt, and cooling under stirring. No salt spots are observed in the crust of the baker bread and a 26% decrease in dough mixing time from 115 seconds to 85 seconds is obtained.

Other suitable waxes and typical melting ranges are listed in Table XII.

TABLE XII

| Wax | Melting range, ° F. |
| --- | --- |
| Carnauba | 175–180 |
| Candelilla | 149–156 |
| Beeswax | 145–158 |
| 50% carnauba, 50% paraffin | |

Dough formulations.—The nature of the dough formulation is not critical in obtaining the beneficial results using the composition of the present invention as a source of salt. Typical suitable commercial dough formulations (based on 100 parts by weight of flour) are recited below.

(A) BREAD FORMULA

| | |
|---|---:|
| Flour | 100.00 |
| Water | 64.00 |
| Yeast | 3.00 |
| Yeast food | .60 |
| Sugar solids | 7.00 |
| Powdered milk | 2.00 |
| Salt | 2.00–2.25 |
| Calcium acid phosphate | .15 |
| Inhibitor | .10 |
| Shortening blend | 3.00 |
| Emulsifier | .25 |

Vitamin and iron enrichment, as appropriate.

(B) ROLL DOUGH

| | |
|---|---:|
| Flour | 100.00 |
| Water | 57.00 |
| Yeast | 4.00 |
| Yeast food | .65 |
| Enzymes | .25 |
| Sugar solids | 12.00 |
| Powdered milk | 1.00 |
| Salt | 1.75–2.00 |
| Calcium acid phosphate | .25 |
| Inhibitor | .15 |
| Shortening blend | 8.00 |
| Emulsifier | .50 |

Vitamin and iron enrichment as appropriate.

(C) SWEET DOUGH

| | |
|---|---:|
| Suitable flour | 100.00 |
| Water | 60.00 |
| Yeast | 8.00 |
| Yeast food | .65 |
| Sugar solids | 22.00 |
| Powdered milk | 2.00 |
| Salt | 1.75 |
| Calcium acid phosphate | .20 |
| Hydrogenated vegetable shortening | 16.00 |
| Egg yolks | 7.00 |

Spices, to suit.

(D) RAISED DOUGHNUT FORMULA

| | |
|---|---:|
| Suitable flour | 100.00 |
| Water | 60.00 |
| Yeast | 5.00 |
| Yeast food | .50 |
| Sugar solids | 12.00 |
| Powdered milk | 2.00 |
| Salt | 1.75 |
| Calcium acid phosphate | .20 |
| Egg yolks | 4.00 |
| Vegetable shortening | 10.00 |
| Baking powder | .75 |

Spices, to suit.

(E) CRACKER DOUGH

| | |
|---|---:|
| Suitable flour | 100.00 |
| Water | 45.00 |
| Salt | 2.00 |
| Yeast | .20 |
| Yeast food | .50 |
| Sodium bicarbonate | .50 |
| Shortening | .25 |

It will be understood that salt particles carrying the specified suitable edible film or coating are used in accordance with the invention in formulating any of the doughs exemplified above. Ordinarily a sufficient weight of the coated salt is used so that the salt itself, without including the weight of the coating, is supplied in the amount specified for the conventional or other desired dough formula. The same coating formulations and techniques may be used as with the salt added to ordinary bread doughs. If a particular dough formulation requires more energetic or extensive kneading or working to achieve optimum development, a heavier coating may be indicated for the salt particles to avoid deleterious effects from increased abrasion or from premature release of the coated material.

*Additional advantage.*—Another result, often advantageous, of a substantial limitation in the amount of soluble salt present in the dough is associated with the amount of water which the dough can carry without deterioration of its handling characteristics and quality. Thus, effective exclusion of the approximately 2% dissolved salt ordinarily present in the dough, as by the provision of a coating material on the salt in accordance with the present invention, permits inclusion of several percent more water in the dough, based on the weight of flour, without excessive stickiness or other impairment of the desired consistency of the dough. After baking such a dough the baked product ordinarily is found to stay noticeably fresher during longer periods of storage prior to consumption.

*Other edible coatings.*—It may prove advisable, in some instances using the various coating materials as defined and exemplified above, to include in the coating material additional edible film-forming ingredients such, for example, as shellac or gums, to improve the resistance of the coating to loss by dissolution or abrasion during the mixing operation or to facilitate complete removal of the coating in good time before the baking is completed.

*Film-forming emulsifier.*—While the invention has been particularly exemplified in terms of a salt bearing a fat, hydrogenated oil or wax coating in which a dispersing agent is distributed when application is made to a coarse particle in salt, it will be understood that other releasable edible coatings may be used. In general, film-forming emulsifiers having suitable melting points as previously defined, may be used effectively without a dispersing agent, whether applied to fine or coarse particle salt without noticeable salt spot formation in the top crusts of the baked products. Among such materials monoglycerides and mono- and diglyceride mixtures containing a high proportion of mono- are particularly useful. Such products are generally prepared by a conventional glycerolysis reaction in which a triglyceride oil or fat is reacted with glycerine in the presence of a catalyst as disclosed in U.S. Pat. 3,433,645. Distilled (90% alpha minimum) monoglycerides are particularly effective.

Example 9

This example illustrates use of a monoglyceride as an edible film-forming coating which both protects the salt from dissolution during mixing and releases it during proofing thereby avoiding "salt-spot" formation without use of a dispersing agent in the coating even though the monoglyceride is applied to a coarse salt.

The procedure of Run "2" of Example 2 is repeated except that portions of the hydrogenated cottonseed oil as a coating upon common baker's (coarse) salt are replaced by a distilled glycerol monostearate with a melting point of 160° F. ("Myverol 1806") as indicated in Table XIII.

TABLE XIII

| Percent by wt. of monostearate | Mixing time | Salt-spots in top crust |
|---|---:|---|
| 0 | 60 | Many. |
| 50 | 60 | Do. |
| 100 | 107 | None. |

Example 10

This example illustrates the "releasable" nature of the coating material of the composition of the present invention, i.e. the ability of the coating to separate from the salt particle late in the mixing cycle and during subsequent dough conditioning processing. The technique also provides a method of observing the "releasability" characteristics of coating candidates.

Two samples of regular Baker's salt (coarse) are coated (10% by weight coating) with hydrogenated cottonseed oil containing a small quantity of finely powdered charcoal to act as a tracer; one coated sample (A) contains no hydroxylated lecithin whereas the second (B) contains 2½% by weight, based on the weight of the coating of hydroxylated lecithin. Each coated salt sample (along with an uncoated control, "C") is used as the salt component in a dough formula as follows:

|  | G. |
|---|---|
| Flour | 200 |
| Water | 140 |
| Salt | 4 (net) |

Yeast is omitted to minimize changes and to suppress the dynamic character of the dough so that the dispersion of the coating throughout the dough structure during dough processing can be mode readily traced. The doughs are mixed to a power peak in a National-Swanson laboratory dough mixer, thereafter allowed to rest for 20 minutes, stretched onto a sheet about 10" x 10", mounted on a piece of cardboard and observed. Distinct, relatively large carbon spots are visible upon the dough made from sample A (i.e. no hydroxylated lecithin), indicating little separation of salt and coating; relatively small, well dispersed charcoal particles are visible in dough sample B (i.e. made from coated salt containing hydroxylated lecithin), indicating release of the coating from the salt and dispersion of the coating through the body of the dough. Mixing time to obtain optimum dough consistency are:

|  | Minutes |
|---|---|
| A | 3½ |
| B | 4 |
| C | 8 |

The coating of sample "B" is demonstrated to be "releasable," i.e. to separate from the salt particle prior to baking. Releasability is considered essential in any coating material is objectionally large salt spots upon the crusts of the baked product are to be avoided.

Many equivalent modifications of the present invention will be apparent to those skilled in the art from a reading of the above without a departure from the inventive concept.

What is claimed is:

1. In a method of making baked goods which includes preparing a dough (1) by mixing dough ingredients comprising flour, water, yeast, and salt in flavoring amount, (2) working said dough in a kneading operation until said dough achieves substantial optimum consistency, (3) forming said dough into shapes suitable for baking, (4) proofing the shaped dough and (5) baking the proofed shapes, the improvement which comprises supplying said salt to said dough in the form of a salt-liberating composition wherein the salt particles bear an edible, film-forming coating, (I) which will substantially completely separate from said particles during the period of dough preparation but resist appreciable separation from said particles due to mixing of said dough to optimum consistency, and (II) melting below about 200° F. and being non-tacky at room storage temperatures said coating being selected from the class consisting of (a) a film-forming, water-resistant emulsifier and (b) a film-forming material selected from the group consisting of (i) a fat, (II) a hydrogenated oil of animal or vegetable origin, (iii) a wax of animal or vegetable origin and (iv) a higher alkane wax; provided however, that where said particles are so coarse that at least about 65% by weight of said particles, prior to coating, are retained on a U.S. standard 60 mesh screen, said material bears, dispersed substantially uniformly throughout, at least about 0.1% by weight based on the weight of said material of a dispersing agent.

2. The method of claim 1, in which active yeast is supplied to the dough mixture in a brew or sponge, said salt-liberating composition being added to the dough mixture after supplying thereto said brew or sponge but before said working of the dough mixture.

3. The method of claim 2, in which said film-forming coating comprises from about 8% to 30% by weight of the weight of said salt-liberating composition salt.

4. The method of claim 1, in which said film-forming coating is hydrogenated cottonseed oil having a melting point of approximately 140° F., said coating comprises from 10% to 20% by weight of the weight of said salt-liberating composition and the particles of said salt prior to coating are so fine that more than about 65% by weight of said particles pass through a U.S. standard 60 mesh screen.

5. The method of claim 1, in which said film-forming coating, comprises from about 10% to 20% by weight of the weight of said salt-liberating composition, the particles of said salt prior to coating are so coarse that at least about 65% by weight of said particles are retained on a U.S. standard 60 mesh screen and said dispersing agent distributed throughout said coating is hydroxylated lecithin.

6. The method of claim 1, wherein from about 10 to 90 parts of L-cysteine per million parts of fluor is employed as a dough ingredient.

7. The method of claim 1, wherein said dough ingredients include yeast food, dough oxidant and enzyme in sufficient quantity to provide a no-time dough.

8. In a continuous method of making baked goods which comprises continuously supplying to a blending operation dough ingredients comprising flour, water, yeast, and salt in flavoring amount to produce a substantially complete premixed dough material, continuously advancing said dough material into, through, and out of a confined region substantially filled with said dough, continuously working said dough material in a kneading operation as it traverses said confined region until said dough achieves substantially optimum consistency, forming said dough as it is discharged from said confined region into shapes, permitting said dough so shaped to rest for a proofing period of not over several hours, and then baking said dough, the improvement which comprises supplying said salt to said blending operation in the form of a free-flowing, salt-liberating composition comprising particles of common salt bearing an edible film-forming coating, (I) which will substantially completely separate from said particles during the period of dough preparation but resist appreciable separation from said particles due to mixing of said dough to optimum consistency and (II) melting below about 200° F. and being non-tacky at room storage temperatures, said coating being selected from the class consisting of (a) a film-forming, water-resistant emulsifier and (b) a film-forming material selected from the group consisting of (i) a fat, (ii) a hydrogenated oil of animal or vegetable origin, (iii) a wax of animal or vegetable origin and (iv) a higher alkane wax; provided however, that where said particles are so coarse that at least about 65% by weight of said particles, prior to coating, are retained on a U.S. standard 60 mesh screen, said material bears, dispersed substantially uniformly throughout, at least about 0.1% by weight based on the weight of said material of a dispersing agent.

9. The process of claim 8, wherein said film-forming coating is hydrogenated vegetable oil.

10. The process of claim 8, wherein said dispersing agent is hydroxylated lecithin.

11. A no-time dough component comprising (I) a free-flowing salt-liberating composition for use in a dough preparation comprising particles of common salt bearing an edible film-forming coating of hydrogenated cottonseed oil having a melting point of approximately 140° F., said coating comprising from 10% to 20% by weight of said salt-liberating composition and the particles of said salt prior to coating being fine enough so that more than about 65% by weight of said particles pass through a U.S. standard mesh screen in admixture with (II), a mixture of (a) from about 0.0025 to about 0.05 part of yeast food, (b) from about 0.00025–0.003 part dough oxidant and (c) 0.00025–0.0025 part of dough conditioning enzyme, all parts being parts by weight based on said salt-liberating composition.

References Cited

UNITED STATES PATENTS

| | | | |
|---|---|---|---|
| 3,261,692 | 7/1966 | Chang et al. | 99—143 X |
| 3,516,836 | 6/1970 | Shea | 99—90 R |
| 2,953,460 | 9/1960 | Baker | 99—90 R |
| 3,362,829 | 1/1968 | Landfried et al. | 99—86 X |
| 3,053,666 | 9/1962 | Henika | 99—91 X |

OTHER REFERENCES

Dalby, G.: The Mixing of Bread Doughs, The Bakers Digest, August 1960, vol. 34 (pp. 34–39) TX76155.

A. LOUIS MONACELL, Primary Examiner

D. M. NAFF, Assistant Examiner

U.S. Cl. X.R.

99—86, 90 CB, 91, 143